March 20, 1928.

M. SMOLENSKY

CHECK VALVE BODY

Filed Aug. 5, 1927

1,662,869

INVENTOR
Michael Smolensky
BY
John A. Bommhardt
ATTORNEY

Patented Mar. 20, 1928.

1,662,869

UNITED STATES PATENT OFFICE.

MICHAEL SMOLENSKY, OF CLEVELAND, OHIO.

CHECK-VALVE BODY.

Application filed August 5, 1927. Serial No. 210,865.

This invention relates to valve bodies for check valves or the like.

In the construction of check valves of large size, say up to three or four feet in diameter, the construction of a strong and sufficient body is quite a problem, if the full clearance of the valve is to be retained. The spider in a valve restricts the passage somewhat, and a relatively large passage must be left around the edge of the valve disk to permit a capacity flow.

The object of the present invention is to produce a body having requisite strength, without great increase in the outside dimensions, and provided with means for connecting the same to the flanges of the adjacent pipe sections in such manner that the connection will not break and which can be readily connected or disconnected. By means of the present invention the flanges of the body are strengthened by placing ribs or webs between the body and the flanges, with recesses therebetween through which the nuts are accessible.

Figure 1:
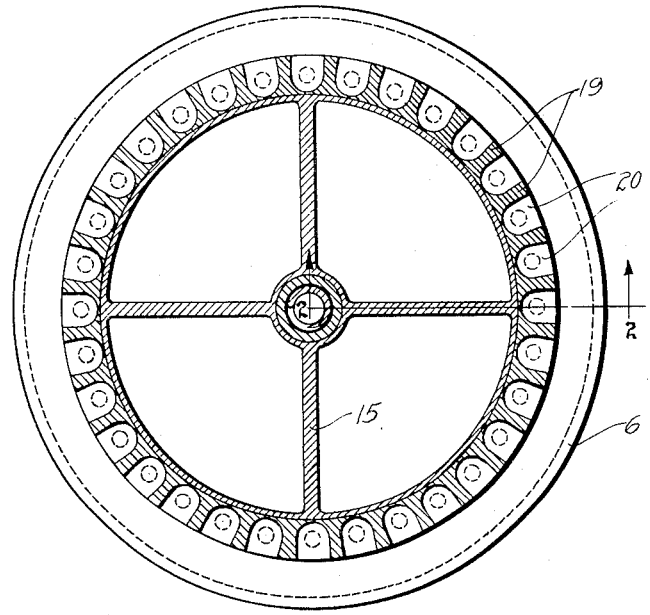
Figure 2:
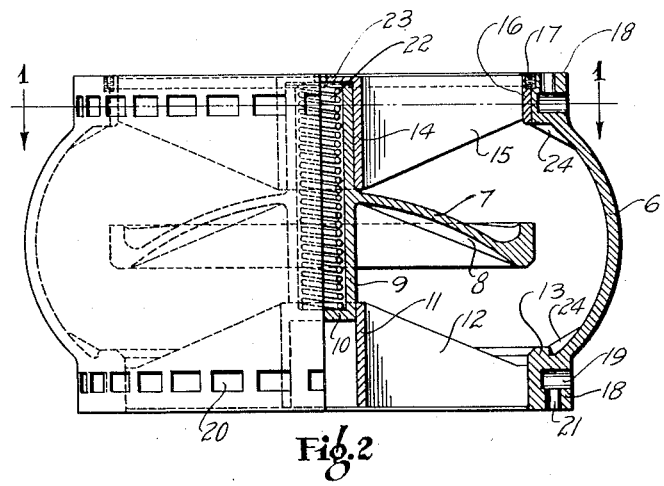

The invention is illustrated in the accompanying drawings in which Fig. 1 is a section on the line 1—1 of Fig. 2. Fig. 2 is a section on the line 2—2 of Fig. 1.

In the drawings, 6 indicates a globular valve body containing the check valve disk 7. This disk is strengthened by ribs 8 on its concave side, and has a central tube 9 closed at one end as indicated at 10, and projecting on opposite sides of the disk. On one side the tube works in the guide 11 supported by spider arms 12 which are integral with the valve body and projecting from the seat ring 13 against which the valve closes. At the opposite side the tube 9 works in the guide 14 supported by spider arms 15 which project from a ring 16 fitting in the end of the body where it is held by a plurality of lock screws 17.

The ends or faces of the body are provided with thickened rings or flanges 18 which are connected to the main part of the body by webs 19 which are spaced apart as clearly shown in Fig. 1 to form recesses 20 between the ribs, and holes 21 are formed in the flanges, communicating with these recesses and adapted to match with bolt holes in the flanges of the pipe sections to which the valve is attached.

The valve is pressed toward its seat by a coiled spring 22 pressing at one end against the end 10 of the tube 9 and at the other end against the head 23 at the end of the tube 14. The ribbed construction at the flanges 18 give great strength, while the recesses 20 permit the nuts of connecting bolts to be operated from the outside. The weakness of the ordinary projecting flanges is avoided, which is a matter of importance in castings of large size, and the connection between the main body of the casing and the flanged ends is further strengthened by a plurality of ribs 24 located at the inside. The end connections are therefore particularly strong and sufficient to withstand great strain and shock.

I claim:

1. A check valve comprising a globular body provided at the ends with thickened portions which contain in themselves lateral recesses to receive bolt heads and holes opening into said recesses to receive the bolts, the thickened portion at one end having an internal valve seat and a spider integral therewith provided with a central guide, an opposite removable spider fitting and fixed in the thickened portion at the other end, and provided with a central guide, and a disk valve in the body, having stems working in said guides.

2. A check valve as set forth in claim 1, and internal reinforcing ribs connecting the thickened portions and the body.

3. A check valve as set forth in claim 1, the outer end of the guide of the removable spider being closed and the stems being hollow, and a coiled spring confined in said stems and bearing against said closed end.

In testimony whereof, I do affix my signature.

MICHAEL SMOLENSKY.